US008477865B2

(12) United States Patent  (10) Patent No.: US 8,477,865 B2
Maruyama et al.  (45) Date of Patent: Jul. 2, 2013

(54) MIMO RECEIVING APPARATUS AND METHOD

(75) Inventors: Kunifusa Maruyama, Tokyo (JP); Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 333 days.

(21) Appl. No.: 12/933,505

(22) PCT Filed: Mar. 25, 2009

(86) PCT No.: PCT/JP2009/055916
§ 371 (c)(1),
(2), (4) Date: Sep. 20, 2010

(87) PCT Pub. No.: WO2009/119645
PCT Pub. Date: Oct. 1, 2009

(65) Prior Publication Data
US 2011/0044383 A1  Feb. 24, 2011

(30) Foreign Application Priority Data
Mar. 25, 2008 (JP) ................. 2008-077631

(51) Int. Cl.
H04B 7/02 (2006.01)
(52) U.S. Cl.
USPC ........... 375/267; 375/260; 375/259; 375/310; 370/335; 370/343; 455/101; 455/103; 455/132
(58) Field of Classification Search
USPC .................. 375/267, 260, 259, 310; 370/335, 370/343; 455/101, 103, 132
See application file for complete search history.

(56) References Cited

U.S. PATENT DOCUMENTS

2006/0258303 A1* 11/2006 Taira et al. ............... 455/101
2008/0205561 A1*  8/2008 Zhou et al. ............... 375/346
2009/0016455 A1*  1/2009 Hoejen-Soerensen ....... 375/260

FOREIGN PATENT DOCUMENTS

| CN | 1881970 A | 12/2006 |
| EP | 1 770 936 A1 | 4/2007 |
| JP | 3-220825 A | 9/1991 |
| JP | 3875086 B | 1/2007 |
| WO | 2004095730 A | 11/2004 |
| WO | 2006109474 A | 10/2006 |

OTHER PUBLICATIONS

International Search Report for PCT/JP2009/055916 mailed Apr. 28, 2009.
X, Zhu et al. "Novel Frequency-Domain Equalization Architectures for a Single-Carrier Wireless MIMO System", IEEE VTC2002-Fall, Sep. 2002, pp. 874-878.
M. Kimata et al., "A Study of Frequency Domain Demodulation Scheme in Uplink Single-Carrier IFDMA", Proceedings of the IEICE General Conference 2006, B-5-36, 2006, p. 388.
Korean Office Action for KR10-2010-7020778 issued Nov. 16, 2011.
J. Wang et al., "Performance of Linear interpolation-Based MIMO Detection for MIMO-OFDM Systems", WCNC 2004, IEEE Communications Society, Mar. 21, 2004, pp. 981-986.
O. Ureten et al , "Decision Directed Iterative Equalization of OFDM Symbols Using Non-Uniform Interpolation", Crown, Sep. 25, 2006.
Chinese Office Action for CN 200980110529.6 issued on Feb. 18, 2013 with English Translation.

* cited by examiner

Primary Examiner — Zewdu Kassa

(57) ABSTRACT

A coherent bandwidth calculation unit (41) calculates a coherent bandwidth based on a channel response in the time domain obtained from reception signals ($R_1$-$R_N$) for each path between transmitting antennas and receiving antennas. A weight calculation control unit (42) determines target subcarriers of equalization weight calculation based on the coherent bandwidth. A weight calculation unit (31) calculates the equalization weight of each target subcarrier. A weight interpolation unit (43) performs interpolation processing using the equalization weights so as to obtain equalization weights for the subcarriers that have not undergone equalization weight calculation yet.

12 Claims, 5 Drawing Sheets

MIMO RECEIVING APPARATUS AND METHOD

The present application is the National Phase of PCT/JP2009/055916, filed Mar. 25, 2009, which claims priority based on Japanese patent application No. 2008-077631 filed on Mar. 25, 2008.

TECHNICAL FIELD

The present invention relates to a wireless communication technique and, more particularly, to a MIMO multiplexing scheme of converting single-carrier signals received by a plurality of receiving antennas into signals in the frequency domain and demodulating them by signal processing in the frequency domain.

BACKGROUND ART

In a wireless communication scheme of next-generation mobile communications, it is important to implement high-speed data transmission. As a technique of implementing high-speed data transmission, a MIMO (Multiple Input Multiple Output) multiplexing scheme has received a great deal of attention, which transmits signals from a plurality of transmitting antennas using the same frequency and time, and performs signal demodulation (signal demultiplexing) using a plurality of receiving antennas.

FIG. 4 is an explanatory view showing the schematic arrangement of a MIMO transmitting/receiving apparatus. In the illustrated example, the number of transmitting antennas is M (M is an integer of 1 or more), and the number of receiving antennas is N (N is an integer of 1 or more).

Referring to FIG. 4, the transmitting side includes transmitting antennas $A_{11}$ to $A_{1M}$ and a transmitting apparatus 1. The receiving side includes receiving antennas $A_{21}$ to $A_{2N}$ and a receiving apparatus 2. Different transmission signals $S_1$ to $S_M$ are transmitted from the plurality of transmitting antennas $A_{11}$ to $A_{1M}$ using the same frequency and time, and reception signals $R_1$ to $R_N$ are received using the plurality of receiving antennas $A_{21}$ to $A_{2N}$. This enables high-speed data transmission in proportion to the number of transmitting antennas without increasing the transmission bandwidth. On the receiving side, it is necessary to demultiplex the transmission signals $S_1$ to $S_M$ from the plurality of transmitting antennas $A_{11}$ to $A_{1M}$ from the reception signals $R_1$ to $R_N$ received by the plurality of receiving antennas $A_{21}$ to $A_{2N}$ to output demodulated signals $D_1$ to $D_M$.

There are various kinds of MIMO multiplexed signal demodulation methods. A relatively simple method is linear filter reception. When the MIMO multiplexing scheme is applied to a single-carrier signal, it suffers not only interferences from other transmitting antennas but also the interference of the multipath of the desired transmitting antenna signal. In this case, filter reception capable of simultaneously suppressing these interferences is effective. There is proposed a frequency equalizer that can greatly decrease the calculation amount by executing the signal processing in the frequency domain (for example, reference 1: Xu Zhu and Ross D. Murch, "Novel Frequency-Domain Equalization Architectures for a Single-Carrier Wireless MIMO System", IEEE VTC2002-Fall, pp. 874-878, September 2002).

The frequency equalizer needs channel estimation in the frequency domain to calculate equalization weights. For this purpose, there is proposed a method of estimating a channel by converting a reference reception signal directly into the frequency domain and correlating it with a reference signal in the frequency domain (for example, reference 2: Kimata and Yoshida, "A Study of Frequency Domain Demodulation Scheme in Uplink Single-Carrier IFDMA", Proceedings of the IEICE General Conference 2006, B-5-36).

FIG. 5 is a block diagram showing the arrangement of an associated MIMO receiving apparatus. FIG. 5 illustrates an arrangement example in which the frequency domain equalizer and frequency domain channel estimation described in references 1 and 2 are used in a MIMO receiving apparatus for single-carrier signals. The MIMO receiving apparatus will be explained in which the number of transmitting antennas is M (M is an integer of 1 or more), and the number of receiving antennas is N (N is an integer of 1 or more).

The MIMO receiving apparatus includes, as main processing units, N reception signal processing units 10 corresponding to reception signals $R_1$ to $R_N$, a weight calculation unit 31, an equalization filter 32, and inverse discrete Fourier transform (IDFT) units $33_1$ to $33_M$.

Each reception signal processing unit $10_n$ (n is an integer of 1 to N) includes, as main processing units, a cyclic prefix (CP) removing unit (to be referred to as a CP removing unit hereinafter) $11_n$, a fast Fourier transform unit (FFT) $12_n$, a subcarrier demapping unit $13_n$, and M channel estimation value calculation units $20_{1n}$ to $20_{Mn}$ corresponding to transmission signals $S_1$ to $S_M$.

In the reception signal processing unit $10_n$, the CP removing unit $11_n$ receives a reception signal $R_n$, and removes a portion corresponding to CP from the reception signal.

The FFT unit $12_n$ receives the reception signal that has undergone CP removal by the CP removing unit $11_n$, performs FFT of NFFT points (NFFT is a power of 2), and outputs the reception signal converted into the frequency domain.

The subcarrier demapping unit $13_n$ receives the reception signal converted into the frequency domain by the FFT unit $12_n$, selects only subcarriers included in the communication band of target data communication while thinning out unnecessary subcarriers, and outputs the subcarriers as the signal bandwidth reception signals of the reception signal $R_n$.

Each channel estimation value calculation unit $20_{mn}$ (m is an integer of 1 to M) calculates the channel estimation value of a transmission signal $S_m$ included in the reception signal $R_n$ using the signal bandwidth reception signal of the reception signal $R_n$ output from the subcarrier demapping unit $13_n$ as a reference reception signal. The channel estimation value calculation unit $20_{mn}$ includes a reference signal generation unit $21_{mn}$, a correlation processing unit $22_{mn}$, an inverse fast Fourier transform (IFFT) unit (to be referred to as an IFFT unit hereinafter) $23_{mn}$, a noise path removing unit $24_{mn}$ and an FFT unit $25_{mn}$.

The reference signal generation unit $21_{mn}$ generates a reference signal to be used in correlation processing for the reference reception signal of the reception signal $R_n$. The reference signal generation unit $21_{mn}$ uses the zero forcing (ZF) method for completely canceling the code characteristic of the reference reception signal, minimum mean square error (MMSE) method for suppressing noise enhancement in correlation processing, clipping method, or the like.

The correlation processing unit $22_{mn}$ performs correlation processing between the reference reception signal of the reception signal $R_n$ and the reference signal from the reference signal generation unit $21_{mn}$ to estimate a channel in the frequency domain, and calculates a channel estimation value $H_{BF,m,n}(k)$ for a subcarrier k ($0 \leq k \leq N_{DFT1}$) between a transmitting antenna $A_{1m}$ and a receiving antenna $A_{2n}$ by $$H_{BF,m,n}(k) = R_{RS,n}(k) X^*_m(k) \qquad \text{[Mathematical 1]}$$

where $x^*_m(k)$ is the reference signal of the transmitting antenna $A_{1m}$ for the subcarrier k generated by the reference signal generation unit $21_{mn}$, $R_{RS,n}(k)$ is the reference reception signal of the receiving antenna $A_{2n}$ for the subcarrier k obtained by the subcarrier demapping unit $13_n$, and the superscript * represents a complex conjugate.

The IFFT unit $23_{mn}$ converts the channel estimation value in the frequency domain estimated by the correlation processing unit $22_{mn}$ into a channel response in the time domain.

The noise path removing unit $24_{mn}$ removes signals (noise paths) of points including only noise from the channel response in the frequency domain output from the IFFT unit $23_{mn}$ by replacing them with 0.

The noise path removing unit $24_{mn}$ uses a time window filter or noise threshold control. Assuming that the channel response falls within the CP width, the time window filter regards signals of points outside the section corresponding to the CP width as noise paths, and replaces them with 0. In noise threshold control, signals of points equal to or smaller than a predetermined threshold are regarded as noise paths and replaced with 0. When both the time window filter and noise threshold control are used, the average value of noise components outside the window of the time window filter is usable as the noise threshold.

The FFT unit $25_{mn}$ performs FFT of the channel response that has undergone noise path removal by the noise path removing unit $24_{mn}$, and outputs the noise-suppressed channel estimation value in the frequency domain.

The weight calculation unit 31 receives the noise-suppressed channel estimation values in the frequency domain output from FFT units $25_{11}$ to $25_{MN}$ in channel estimation value calculation units $20_{11}$ to $20_{MN}$ of reception signal processing units $10_1$ to $10_N$, and calculates equalization weights. The weight calculation unit 31 generally uses the MMSE method or ZF method. An MMSE equalization weight vector $W_m(k)$ of the transmitting antenna $A_{1m}$ for the subcarrier k is calculated by $$W_m(k) = H_{AF,m}^H(k)\left[\sum_{m'=1}^{M} H_{AF,m'}(k)H_{AF,m'}^H(k) + \sigma^2 I\right]^{-1}$$ [Mathematical 2]

where H is a complex conjugate transposition, $\sigma^2$ is noise power, I is a unit matrix, and $H_{AF,m}(k)$ is the channel estimation vector for the subcarrier k between the transmitting antenna $A_{1m}$ and each of the receiving antennas $A_{21}$ to $A_{2n}$. The channel estimation vector $H_{AF,m}(k)$ and the equalization weight vector $W_m(k)$ are defined by $$H_{AF,m}(k)=[H_{AF,m,1}(k),H_{AF,m,2}(k),\ldots,H_{AF,m,N}(k)]^T$$ [Mathematical 3]

$$W_m(k)=[W_{m,1}(k),W_{m,2}(k),\ldots,W_{m,N}(k)]^T$$ [Mathematical 4]

where T is a transposition, and the elements of the channel estimation vector $H_{AF,m}(k)$ represent noise-suppressed channel estimation values in the frequency domain output from the FFT units $25_{11}$ to $25_{MN}$.

The equalization filter 32 receives the equalization weights calculated by the weight calculation unit 31 and the signal bandwidth reception signals of the reception signals $R_1$ to $R_N$ obtained by subcarrier demapping units $13_1$ to $13_N$ of the reception signal processing units $10_1$ to $10_N$, and performs reception signal equalization processing in the frequency domain. A transmission signal vector Y(k) for the subcarrier k equalized and demultiplexed by the equalization filter 32 is calculated by $$Y(k)=W(k)R_D(k)$$ [Mathematical 5]

and defined by $$Y(k)=[Y_1(k),Y_2(k),\ldots,Y_m(k)]^T$$ [Mathematical 6]

where W(k) is the equalization weight matrix for the subcarrier k, and $R_D(k)$ is the reception signal vector for the subcarrier k. The elements of the reception signal vector $R_D(k)$ represent signal bandwidth reception signals of the reception signals $R_1$ to $R_N$ in the frequency domain obtained by the subcarrier demapping units $13_1$ to $13_N$. W(k) and $R_D(k)$ are defined by $$W(k)=[W_1(k),W_2(k),\ldots,W_M(k)]^T$$ [Mathematical 7]

and $$R_D(k)=[R_{D,1}(k)R_{D,2}(k),\ldots,R_{D,N}(k)]^T$$ [Mathematical 8]

The IDFT units $33_1$ to $33_M$ receive equalized signals in the frequency domain output from the equalization filter 32, performs IDFT of $N_{IDFT}$ points ($N_{IDFT}$ is an integer of 2 or more) to convert them into signals in the time domain, and outputs them as demodulated signals $D_1$ to $D_M$.

DISCLOSURE OF INVENTION

Problem to be Solved by the Invention

In this MIMO receiving apparatus, however, the amount of calculation from equalization weight generation to signal demultiplexing is enormous, and the process delay increases as the signal bandwidth becomes wider. This is because the equalization weight to be used in equalization processing for signal demultiplexing is calculated for each subcarrier of the signal bandwidth.

The present invention has been made to solve this problem, and an exemplary object of the invention is to provide a MIMO receiving apparatus and method capable of adaptively controlling a decrease/increase in the calculation amount and process delay by increasing/decreasing the number of target subcarriers of equalization weight calculation in accordance with the propagation environment in MIMO reception where transmission signals are demultiplexed by generating equalization weights.

Means of Solution to the Problem

In order to achieve the above-described object, a MIMO receiving apparatus according to an exemplary aspect of the invention is a MIMO receiving apparatus having a MIMO (Multiple Input Multiple Output) function of receiving, by a plurality of receiving antennas, transmission signals transmitted from a plurality of transmitting antennas, and outputting the transmission signals demultiplexed from reception signals based on equalization weights of arbitrary subcarriers generated from the reception signals, comprising a coherent bandwidth calculation unit that calculates a coherent bandwidth based on a channel response in a time domain obtained from the reception signals for each path between the transmitting antennas and the receiving antennas, a weight calculation control unit that determines target subcarriers of equalization weight calculation based on the coherent bandwidth, a weight calculation unit that calculates the equalization weight of each target subcarrier based on a channel estimation value in a frequency domain obtained from the reception signals for each path between the transmitting antennas and the receiving antennas, and a weight interpolation unit that interpolates the equalization weights so as to calculate equalization weights for the subcarriers that have not undergone equalization weight calculation yet.

A MIMO receiving method according to another exemplary aspect of the invention is a MIMO receiving method using a MIMO (Multiple Input Multiple Output) function of receiving, by a plurality of receiving antennas, transmission signals transmitted from a plurality of transmitting antennas, and outputting the transmission signals demultiplexed from reception signals based on equalization weights of arbitrary subcarriers generated from the reception signals, comprising the steps of calculating a coherent bandwidth based on a channel response in a time domain obtained from the reception signals for each path between the transmitting antennas and the receiving antennas, determining target subcarriers of equalization weight calculation based on the coherent bandwidth, calculating the equalization weight of each target subcarrier based on a channel estimation value in a frequency domain obtained from the reception signals for each path between the transmitting antennas and the receiving antennas, and interpolating the equalization weights so as to calculate equalization weights for the subcarriers that have not undergone equalization weight calculation yet.

Effect of the Invention

According to the present invention, the number of target subcarriers of equalization weight calculation is increased/decreased in accordance with the coherent bandwidth in which the frequency characteristic can be regarded as constant. When the propagation environment is excellent, the number of target subcarriers of equalization weight calculation is decreased, thereby decreasing the calculation amount and thus decreasing the process delay. On the other hand, if the propagation environment is harsh, the number of target subcarriers of equalization weight calculation is increased so as to ensure wireless quality.

BEST MODE FOR CARRYING OUT THE INVENTION

The exemplary embodiments of the present invention will now be described with reference to the accompanying drawings.

First Exemplary Embodiment

Figure 1:
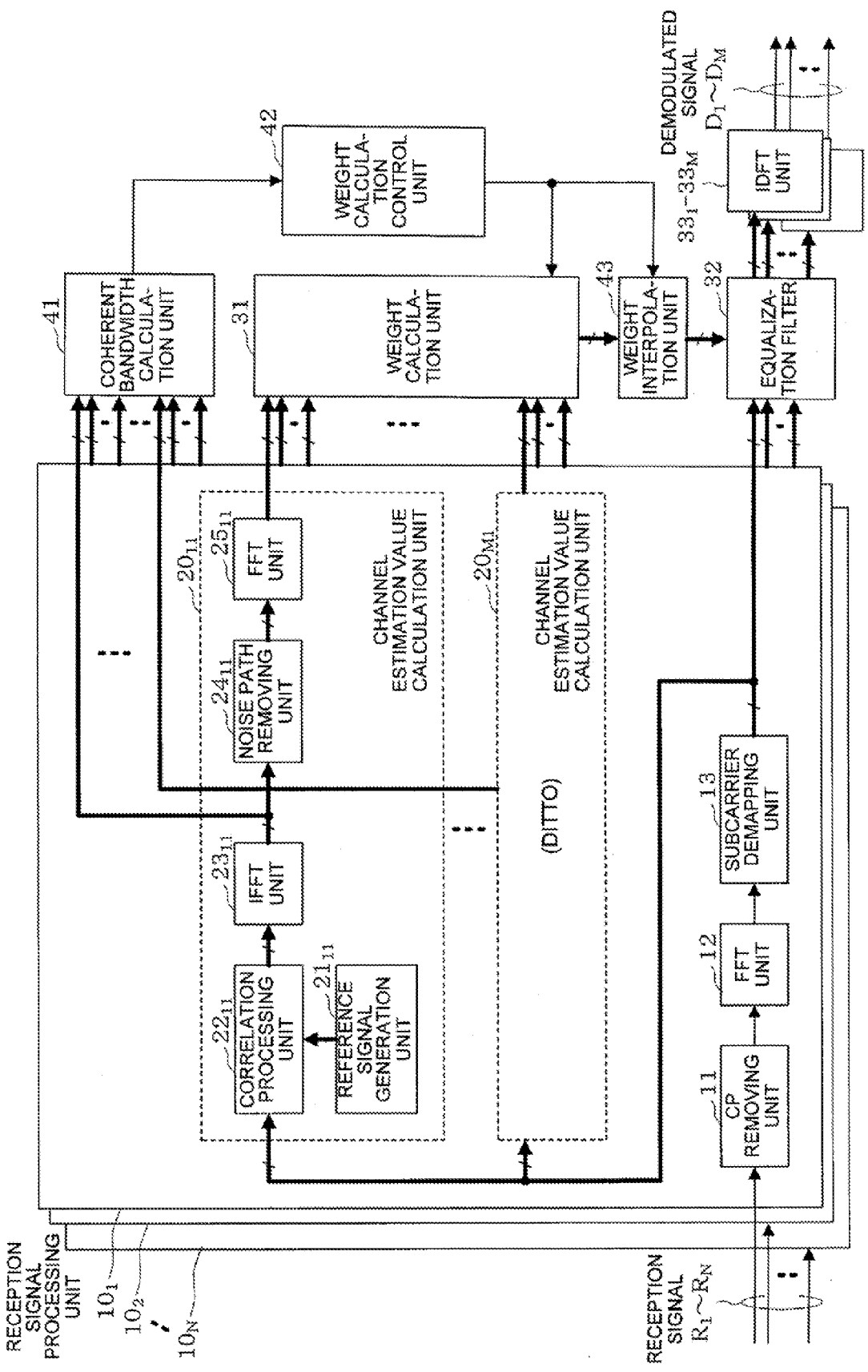
FIG. 1 is a block diagram showing the arrangement of a MIMO receiving apparatus according to the first exemplary embodiment of the present invention.
Figure 5:
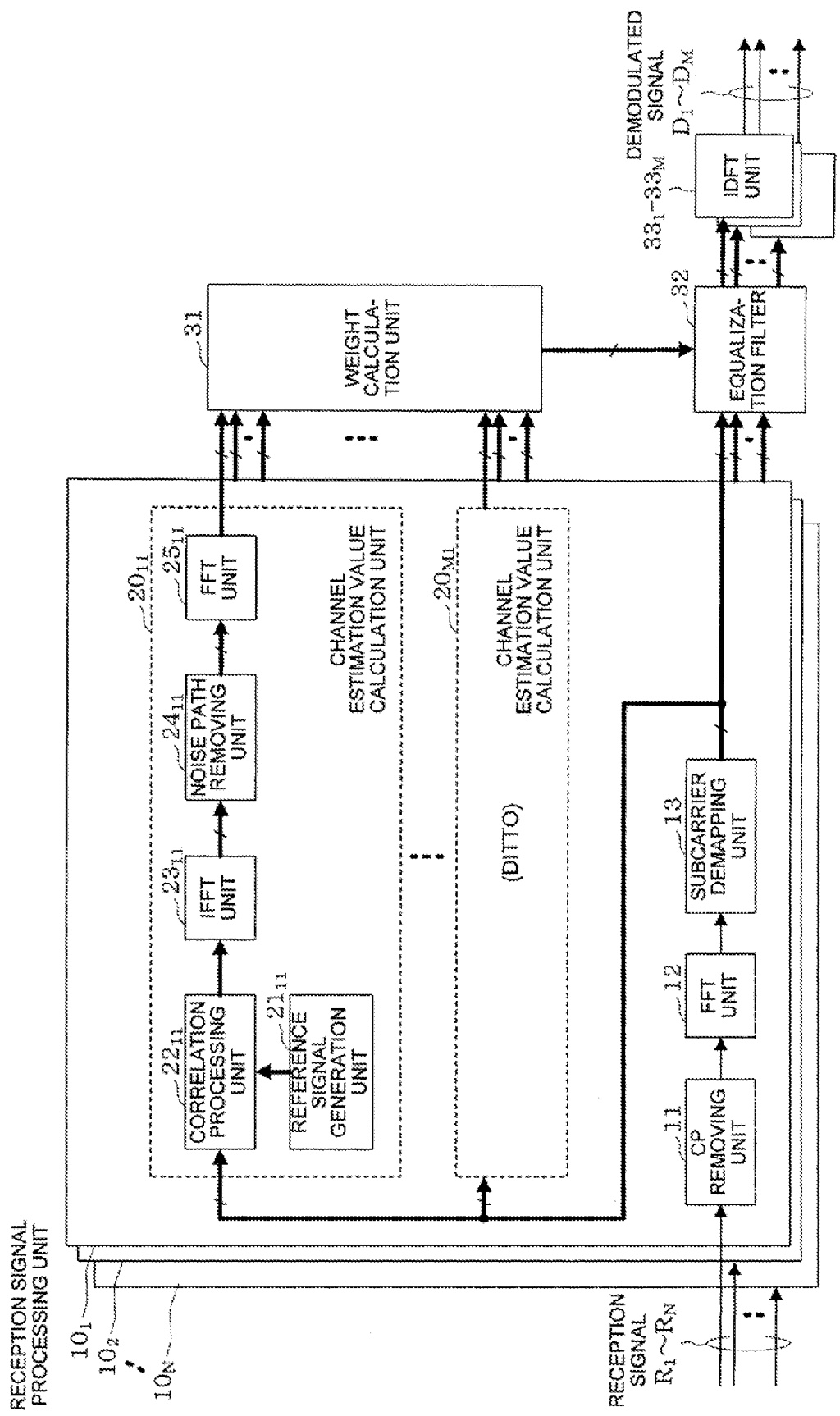
FIG. 5 is a block diagram showing the arrangement of an associated MIMO receiving apparatus.

A MIMO receiving apparatus according to the first exemplary embodiment of the present invention will be described first with reference to FIG. 1. FIG. 1 is a block diagram showing the arrangement of the MIMO receiving apparatus according to the first exemplary embodiment of the present invention. The same reference numerals as in FIG. 5 described above denote the same or similar parts in FIG. 1.

As shown in FIG. 1, the MIMO receiving apparatus according to this exemplary embodiment includes, as main processing units, a coherent bandwidth calculation unit 41, a weight calculation control unit 42, and a weight interpolation unit 43 in addition to N reception signal processing units 10 corresponding to reception signals $R_1$ to $R_N$, a weight calculation unit 31, an equalization filter 32, and inverse discrete Fourier transform (IDFT) units $33_1$ to $33_M$. These units can be formed from dedicated signal processing circuits, an arithmetic processing unit using a CPU, or a combination thereof.

Each reception signal processing unit $10_n$ (n is an integer of 1 to N) includes, as main processing units, a cyclic prefix (CP) removing unit (to be referred to as a CP removing unit hereinafter) $11_n$, a fast Fourier transform unit (FFT) $12_n$, a subcarrier demapping unit $13_n$, and M channel estimation value calculation units $20_{1n}$ to $20_{Mn}$ corresponding to transmission signals $S_1$ to $S_M$.

In the reception signal processing unit $10_n$, the CP removing unit $11_n$ has a function of receiving a reception signal $R_n$, and removing a portion corresponding to CP from the reception signal.

The FFT unit $12_n$ has a function of receiving the reception signal that has undergone CP removal by the CP removing unit $11_n$, performing FFT of NFFT points (NFFT is a power of 2), and outputting the reception signal converted into the frequency domain.

The subcarrier demapping unit $13_n$ has a function of receiving the reception signal converted into the frequency domain by the FFT unit $12_n$, selecting only subcarriers included in the communication band of target data communication while thinning out unnecessary subcarriers, and outputting the subcarriers as the signal bandwidth reception signals of the reception signal $R_n$.

Each channel estimation value calculation unit $20_{mn}$ (m is an integer of 1 to M) calculates the channel estimation value of a transmission signal $S_m$ included in the reception signal $R_n$ using the signal bandwidth reception signal of the reception signal $R_n$ output from the subcarrier demapping unit $13_n$ as a reference reception signal. The channel estimation value calculation unit $20_{mn}$ includes a reference signal generation unit $21_{mn}$, a correlation processing unit $22_{mn}$, an inverse fast Fourier transform (IFFT) unit (to be referred to as an IFFT unit hereinafter) $23_{mn}$, a noise path removing unit $24_{mn}$, and an FFT unit $25_{mn}$.

The reference signal generation unit $21_{mn}$ has a function of generating a reference signal to be used in correlation processing for the reference reception signal of the reception signal $R_n$. The reference signal generation unit $21_{mn}$ uses the zero forcing (ZF) method for completely canceling the code characteristic of the reference reception signal, minimum mean square error (MMSE) method for suppressing noise enhancement in correlation processing, clipping method, or the like.

The correlation processing unit $22_{mn}$ has a function of performing correlation processing between the reference reception signal of the reception signal $R_n$ and the reference signal from the reference signal generation unit $21_{mn}$ to estimate a channel in the frequency domain, and obtaining a channel estimation value for a subcarrier k ($0 \leq k \leq N_{DFT1}$) between a transmitting antenna $A_{1m}$ and a receiving antenna $A_{2n}$.

The IFFT unit $23_{mn}$ has a function of converting the channel estimation value in the frequency domain estimated by the correlation processing unit $22_{mn}$ into a channel response in the time domain.

The noise path removing unit $24_{mn}$ has a function of removing signals (noise paths) of points including only noise from the channel response in the frequency domain output from the IFFT unit $23_{mn}$.

The FFT unit $25_{mn}$ has a function of performing FFT of the channel response that has undergone noise path removal by the noise path removing unit $24_{mn}$, and outputting the noise-suppressed channel estimation value in the frequency domain.

The coherent bandwidth calculation unit 41 has a function of calculating a coherent bandwidth from the outputs of IFFT units $23_{11}$ to $23_{MN}$ in channel estimation value calculation units $20_{11}$ to $20_{MN}$ of reception signal processing units $10_1$ to $10_N$, i.e., channel responses in the time domain obtained for the respective paths between the transmitting antennas and the receiving antennas.

The weight calculation control unit 42 has a function of receiving the coherent bandwidth obtained by the coherent bandwidth calculation unit 41, determining target subcarriers of equalization weight calculation based on the coherent bandwidth, and outputting subcarrier information representing the target subcarriers.

The weight calculation unit 31 has a function of receiving the outputs of FFT units $25_{11}$ to $25_{MN}$ in channel estimation value calculation units $20_{11}$ to $20_{MN}$ of the reception signal processing units $10_1$ to $10_N$, i.e., the channel estimation values in the frequency domain obtained for the respective paths between the transmitting antennas and the receiving antennas and the subcarrier information output from the weight calculation control unit 42, and calculating an equalization weight for each target subcarrier designated by the subcarrier information.

The weight interpolation unit 43 has a function of receiving the equalization weights output from the weight calculation unit 31 and the subcarrier information representing the target of equalization weight calculation and output from the weight calculation control unit 42, and interpolating the equalization weights from the weight calculation unit 31, thereby calculating equalization weights for, out of the target subcarriers, subcarriers which have not yet undergone equalization weight calculation by the weight calculation unit 31.

The equalization filter 32 has a function of receiving the equalization weights from the weight interpolation unit 43 and the signal bandwidth reception signals of the reception signals $R_1$ to $R_N$ obtained by subcarrier demapping units $13_1$ to $13_N$, and equalizing the signal bandwidth reception signals in the frequency domain, thereby obtaining equalized signals in the frequency domain for a subcarrier k.

The IDFT units $33_1$ to $33_M$ has a function of receiving the equalized signals in the frequency domain output from the equalization filter 32, performing IDFT processing of the equalized signals so as to convert them into signals in the time domain, and outputting demodulated signals $D_1$ to $D_M$ corresponding to the transmission signals $S_1$ to $S_M$.

Operation of First Exemplary Embodiment

Figure 2:
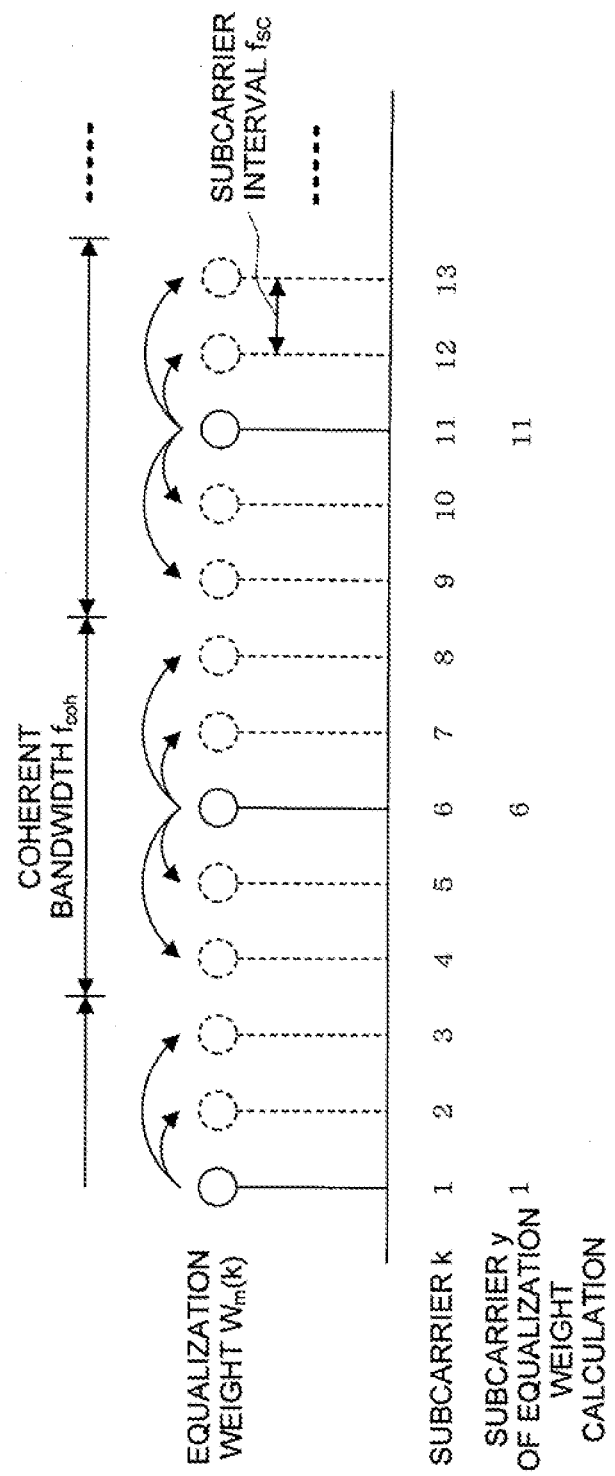
FIG. 2 is an explanatory view showing processing of a weight interpolation unit.

The operation of the MIMO receiving apparatus according to the first exemplary embodiment of the present invention will be described next with reference to FIGS. 1 and 2. FIG. 2 is an explanatory view showing processing of the weight interpolation unit. Note that the reception signal processing units $10_1$ to $10_N$ of the MIMO receiving apparatus according to this exemplary embodiment are the same as in FIG. 5 described above, and a description thereof will not be repeated here.

The coherent bandwidth calculation unit 41 obtains a power profile $P_{m,n}(t)$ in the path from the transmitting antenna $A_{1m}$ to the receiving antenna $A_{2n}$ within a time window width T for each of the channel responses obtained by the IFFT units $23_{11}$ to $23_{MN}$ in the channel estimation value calculation units $20_{11}$ to $20_{MN}$ of the reception signal processing units $10_1$ to $10_N$. The coherent bandwidth calculation unit 41 also obtains an average power profile P(t) by $$P(t) = \frac{1}{M \cdot N} \sum_{n=1}^{N} \sum_{m=1}^{M} P_{m,n}(t) \quad \text{[Mathematical 9]}$$

Next, the coherent bandwidth calculation unit 41 obtains a delay variance a by $$\sigma = \sqrt{\frac{\sum_{t=0}^{T-1} \{P(t) \cdot (t - \bar{t})^2\}}{\sum_{t=0}^{T-1} P(t)}} \quad \text{[Mathematical 10]}$$

where $\bar{t}$ is the time average value weighted by power, which is obtained by $$\bar{t} = \frac{\sum_{t=0}^{T-1} \{P(t) \cdot t\}}{\sum_{t=0}^{T-1} P(t)} \quad \text{[Mathematical 11]}$$

Finally, the coherent bandwidth calculation unit 41 obtains a coherent bandwidth $f_{coh}$ from the delay variance a by $$f_{coh} = \frac{1}{2\pi\sigma} \quad \text{[Mathematical 12]}$$

The weight calculation control unit 42 determines subcarriers y (target subcarriers) of equalization weight calculation, and notifies the weight calculation unit 31 of subcarrier information representing the target subcarriers. The subcarriers y as the target of equalization weight calculation are obtained in the following way.

First, a subcarrier interval $f_{sc}$ is compared with the coherent bandwidth $f_{coh}$. If the subcarrier interval $f_{sc}$ is larger, all subcarriers are defined as y ($0 \leq y \leq N_{DFT}-1$).

On the other hand, if the coherent bandwidth $f_{coh}$ is larger, the subcarriers y as the target of equalization weight calculation are defined as subcarriers at a subcarrier interval that does not exceed the coherent bandwidth $f_{coh}$, as indicated by, for example, $$y = \left[\frac{f_{coh}}{f_{sc}}\right] \cdot x \quad \text{[Mathematical 13]}$$

at $$0 \le x \le \frac{N_{DFT}}{f_{coh}/f_{sc}} - 1$$

The subcarrier interval is set not to exceed the coherent bandwidth $f_{coh}$ because the frequency characteristic can be regarded as constant within the coherent bandwidth $f_{coh}$.

The weight calculation unit 31 calculates equalization weights for the subcarriers y as the target of equalization weight calculation notified by the weight calculation control unit 42.

The weight interpolation unit 43 performs, using the equalization weights of the subcarriers y, interpolation processing for subcarriers other than the subcarriers y as the target of equalization weight calculation notified by the weight calculation control unit 42. For example, as shown in FIG. 2, the equalization weight of each subcarrier y is copied for subcarriers within the range $f_{coh}$ on both sides of the subcarrier y, and used as the equalization weights of subcarriers which have not undergone equalization weight calculation yet.

Effects of First Exemplary Embodiment

As described above, according to this exemplary embodiment, the number of target subcarriers of equalization weight calculation can be increased/decreased in accordance with the coherent bandwidth in which the frequency characteristic can be regarded as constant. Hence, when the propagation environment is excellent, the process delay can be decreased. If the propagation environment is harsh, the reception quality can be ensured.

In this exemplary embodiment, the coherent bandwidth is obtained from the average power profile. However, the above-described processing may be performed in the individual paths by obtaining the coherent bandwidth from the power profile $P_{m,n}(t)$ in the path from the transmitting antenna $A_{1m}$ to the receiving antenna $A_{2n}$.

Second Exemplary Embodiment

Figure 3:
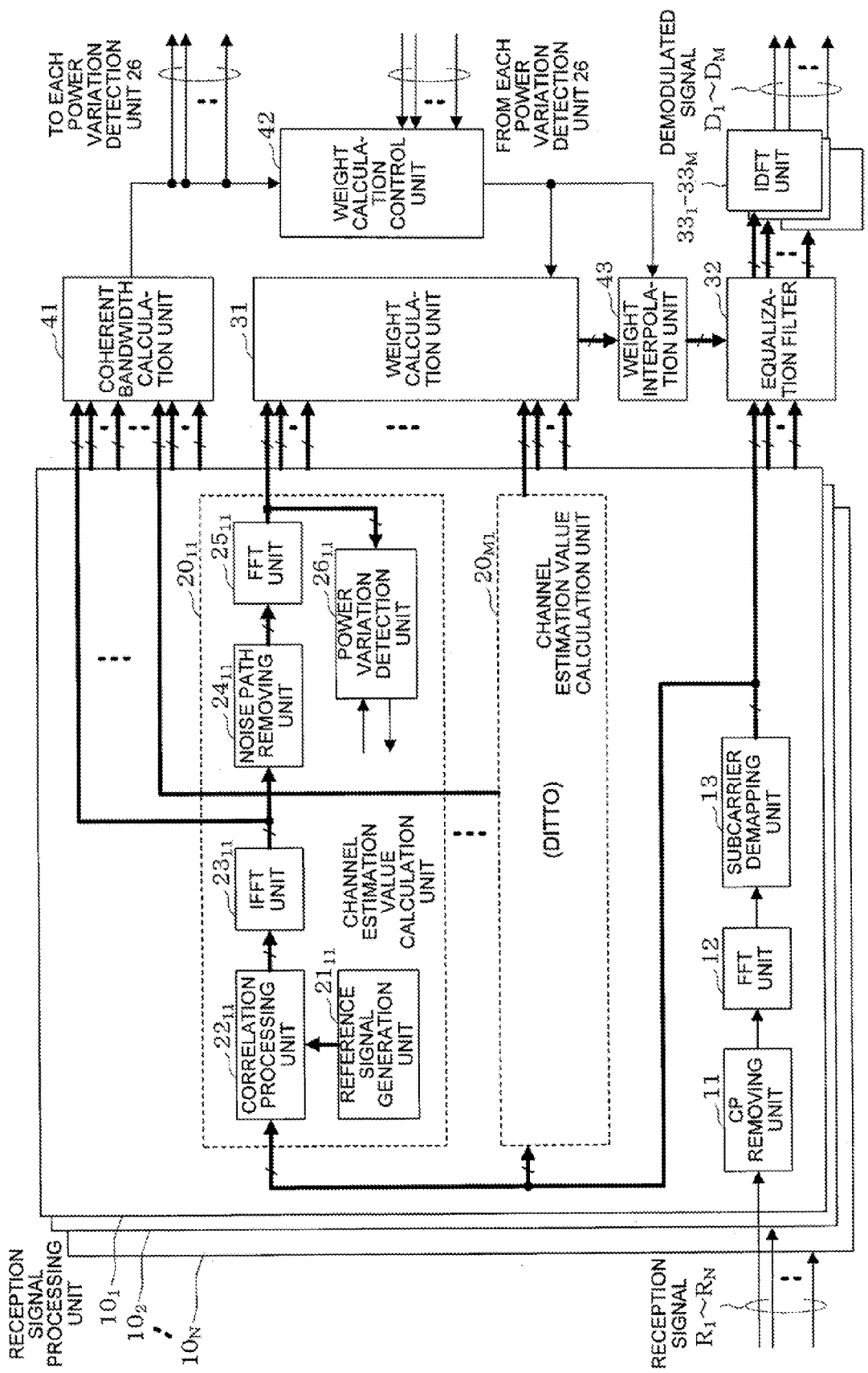
FIG. 3 is a block diagram showing the arrangement of a MIMO receiving apparatus according to the second exemplary embodiment of the present invention.
Figure 4:
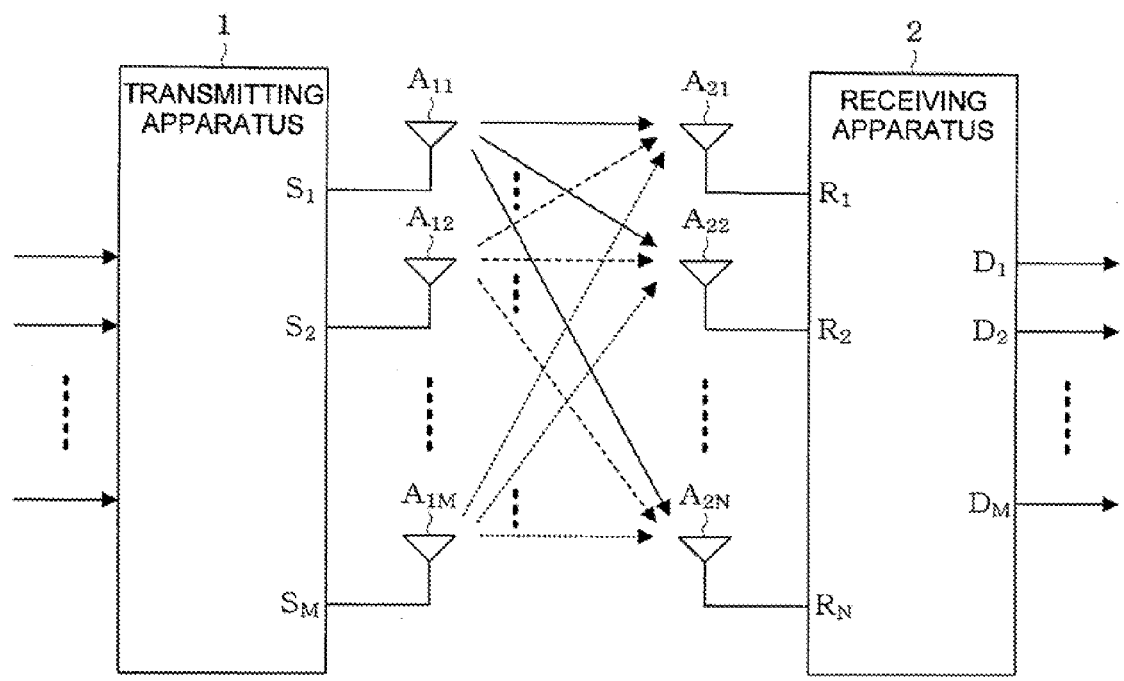
FIG. 4 is an explanatory view showing the schematic arrangement of a MIMO transmitting/receiving apparatus.

A MIMO receiving apparatus according to the second exemplary embodiment of the present invention will be described next with reference to FIG. 3. FIG. 3 is a block diagram showing the arrangement of the MIMO receiving apparatus according to the second exemplary embodiment of the present invention. The same reference numerals as in FIG. 1 denote the same or similar parts in FIG. 3.

As compared to the first exemplary embodiment, power variation detection units $26_{11}$ to $26_{MN}$ are added to channel estimation value calculation units $20_{11}$ to $20_{MN}$ of reception signal processing units $10_1$ to $10_N$ in the MIMO receiving apparatus according to this exemplary embodiment.

A power variation detection unit $26_{mn}$ has a function of receiving a reception signal converted into the frequency domain by an FFT unit $25_{mn}$ and a coherent bandwidth from a coherent bandwidth calculation unit 41, and detecting subcarriers with power variations.

A weight calculation control unit 42 has a function of receiving the coherent bandwidth obtained by the coherent bandwidth calculation unit 41 and the detection results of the power variation detection units $26_{11}$ to $26_{MN}$, determining target subcarriers of equalization weight calculation based on the coherent bandwidth and detection results, and obtaining subcarrier information for equalization weight calculation.

The remaining components of the MIMO receiving apparatus according to this exemplary embodiment are the same as in the first exemplary embodiment, and a detailed description thereof will be omitted here.

Operation of Second Exemplary Embodiment

The operation of the MIMO receiving apparatus according to the second exemplary embodiment of the present invention will be described next.

Each of the power variation detection units $26_{11}$ to $26_{MN}$ in the channel estimation value calculation units $20_{11}$ to $20_{MN}$ of the reception signal processing units $10_1$ to $10_N$ obtains the average reception power in the frequency domain at the coherent bandwidth interval, and compares XdB serving as a detection threshold based on the average reception power with the reception power of each subcarrier within the coherent bandwidth. The power variation detection unit notifies the weight calculation control unit 42 of a subcarrier whose reception power is equal to or smaller than the detection threshold. The weight calculation control unit 42 may be notified of a subcarrier whose reception power is equal to or larger than the detection threshold.

The weight calculation control unit 42 obtains detected subcarriers z that are the ORs of the subcarrier information detected by the power variation detection units $26_{11}$ to $26_{MN}$, adds the detected subcarriers z to subcarriers y (target subcarriers) of equalization weight calculation by the same operation as in the above-described first exemplary embodiment, and outputs subcarrier information representing the target subcarriers.

A weight calculation unit 31 calculates equalization weights for the subcarriers y and detected subcarriers z based on the subcarrier information notified by the weight calculation control unit 42.

A weight interpolation unit 43 obtains the equalization weights of subcarriers other than the subcarriers y by the same operation as in the above-described first exemplary embodiment, and then replaces those of the detected subcarriers z with the equalization weights of the detected subcarriers z obtained by the weight calculation unit 31.

Effects of Second Exemplary Embodiment

As described above, according to this exemplary embodiment, it is possible to prevent degradation in the characteristic even when the phase variations of equalization weights are large.

INDUSTRIAL APPLICABILITY

The present invention is suitable for a MIMO receiving apparatus which converts single-carrier signals received by a plurality of receiving antennas into signals in the frequency domain and demodulates them by signal processing in the frequency domain, and particularly useful in a MIMO receiving apparatus which demultiplexes transmission signals by generating equalization weights.

The invention claimed is:
1. A MIMO receiving apparatus having a MIMO (Multiple Input Multiple Output) function of receiving, by a plurality of receiving antennas, transmission signals transmitted from a plurality of transmitting antennas, and outputting the trans- mission signals demultiplexed from reception signals based on equalization weights of arbitrary subcarriers generated from the reception signals, comprising:
- a coherent bandwidth calculation unit that calculates a coherent bandwidth based on a channel response in a time domain obtained from the reception signals for each path between the transmitting antennas and the receiving antennas;
- a weight calculation control unit that determines target subcarriers of equalization weight calculation based on the coherent bandwidth;
- a weight calculation unit that calculates the equalization weight of each target subcarrier based on a channel estimation value in a frequency domain obtained from the reception signals for each path between the transmitting antennas and the receiving antennas;
- a weight interpolation unit that interpolates the equalization weights so as to calculate equalization weights for the subcarriers that have not undergone equalization weight calculation yet;
- a power variation detection unit that detects a power variation of each subcarrier,
- wherein said power variation detection unit determines a detection threshold from an average reception power in the frequency domain at a coherent bandwidth interval, compares the detection threshold with a reception power of each subcarrier within the coherent bandwidth, and detects, as a detected subcarrier, a subcarrier whose reception power is not more than the detection threshold or not less than the detection threshold.

2. The MIMO receiving apparatus according to claim 1, wherein said weight calculation control unit determines, using the coherent bandwidth obtained by said coherent bandwidth calculation unit, the target subcarriers at a subcarrier interval that does not exceed the coherent bandwidth.

3. The MIMO receiving apparatus according to claim 2, wherein said coherent bandwidth calculation unit calculates the coherent bandwidth from an average power profile.

4. The MIMO receiving apparatus according to claim 2, wherein said coherent bandwidth calculation unit calculates the coherent bandwidth from a power profile in each path between the transmitting antennas and the receiving antennas.

5. The MIMO receiving apparatus according to claim 2, wherein said weight interpolation unit uses, as the equalization weights for the subcarriers that have not undergone equalization weight calculation yet, equalization weights calculated by said weight calculation unit for subcarriers within the coherent bandwidth on both sides of a subcarrier that has undergone equalization weight calculation.

6. The MIMO receiving apparatus according to claim 1, wherein said weight calculation control unit includes the detected subcarrier detected by said power variation detection unit in the target subcarriers as subcarriers that should undergo equalization weight calculation.

7. A MIMO receiving method using a MIMO (Multiple Input Multiple Output) function of receiving, by a plurality of receiving antennas, transmission signals transmitted from a plurality of transmitting antennas, and outputting the transmission signals demultiplexed from reception signals based on equalization weights of arbitrary subcarriers generated from the reception signals, comprising the steps of:
- calculating a coherent bandwidth based on a channel response in a time domain obtained from the reception signals for each path between the transmitting antennas and the receiving antennas;
- determining target subcarriers of equalization weight calculation based on the coherent bandwidth;
- calculating the equalization weight of each target subcarrier based on a channel estimation value in a frequency domain obtained from the reception signals for each path between the transmitting antennas and the receiving antennas;
- interpolating the equalization weights so as to calculate equalization weights for the subcarriers that have not undergone equalization weight calculation yet;
- detecting a power variation of each subcarrier,
- wherein the step of detecting the power variation comprises the step of determining a detection threshold from an average reception power in the frequency domain at a coherent bandwidth interval, comparing the detection threshold with a reception power of each subcarrier within the coherent bandwidth, and detecting, as a detected subcarrier, a subcarrier whose reception power is not more than the detection threshold or not less than the detection threshold.

8. The MIMO receiving method according to claim 7, wherein the step of determining the target subcarriers comprises the step of determining, using the coherent bandwidth obtained in the step of calculating the coherent bandwidth, the target subcarriers at a subcarrier interval that does not exceed the coherent bandwidth.

9. The MIMO receiving method according to claim 8, wherein the step of calculating the coherent bandwidth comprises the step of calculating the coherent bandwidth from an average power profile.

10. The MIMO receiving method according to claim 8, wherein the step of calculating the coherent bandwidth comprises the step of calculating the coherent bandwidth from a power profile in each path between the transmitting antennas and the receiving antennas.

11. The MIMO receiving method according to claim 8, wherein the step of interpolating the equalization weights comprises the step of using, as the equalization weights for the subcarriers that have not undergone equalization weight calculation yet, equalization weights calculated in the step of calculating the equalization weight for subcarriers within the coherent bandwidth on both sides of a subcarrier that has undergone equalization weight calculation.

12. The MIMO receiving method according to claim 7, wherein the step of determining the target subcarriers comprises the step of including the detected subcarrier detected in the step of detecting the power variation in the target subcarriers as subcarriers that should undergo equalization weight calculation.

\* \* \* \* \*